No. 620,963. Patented Mar. 14, 1899.
H. V. R. READ.
MEANS OR APPARATUS FOR AERATING WATER IN BOTTLES.
(Application filed Apr. 9, 1898.)
(No Model.) 3 Sheets—Sheet 1.
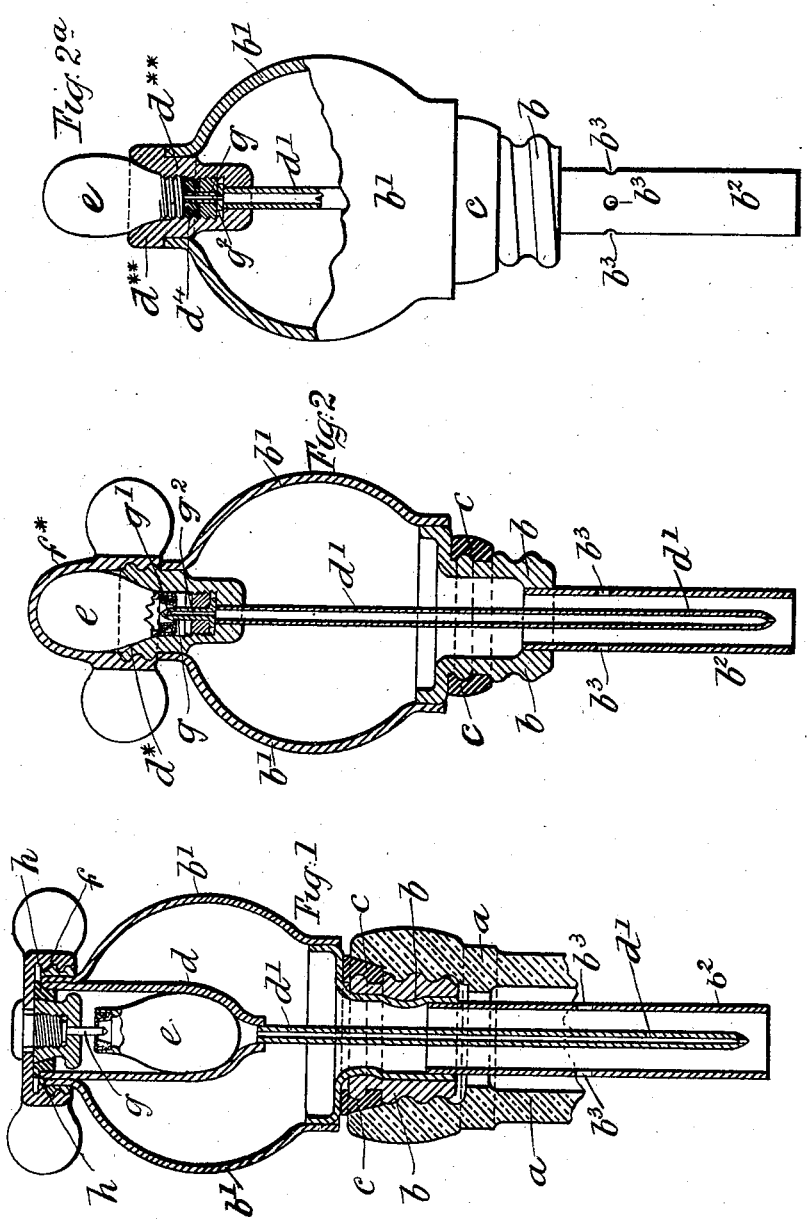

No. 620,963. Patented Mar. 14, 1899.
H. V. R. READ.
MEANS OR APPARATUS FOR AERATING WATER IN BOTTLES.
(Application filed Apr. 9, 1898.)
(No Model.) 3 Sheets—Sheet 2.
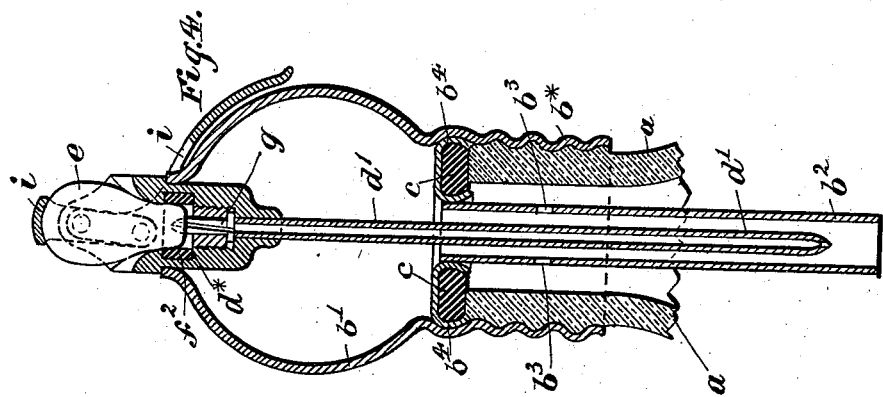
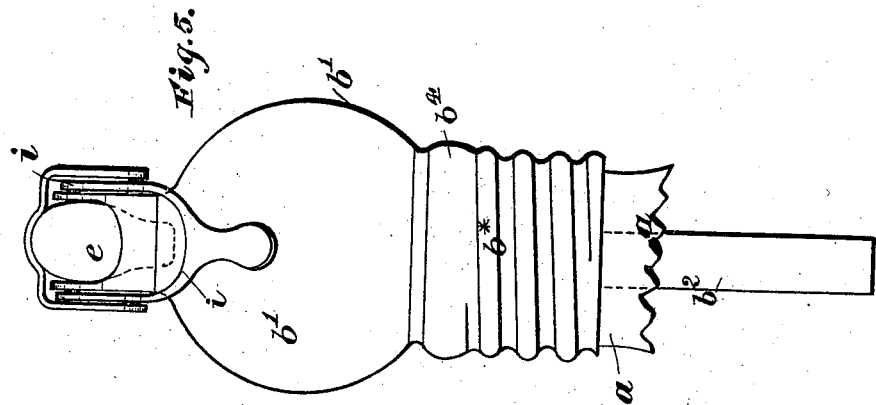
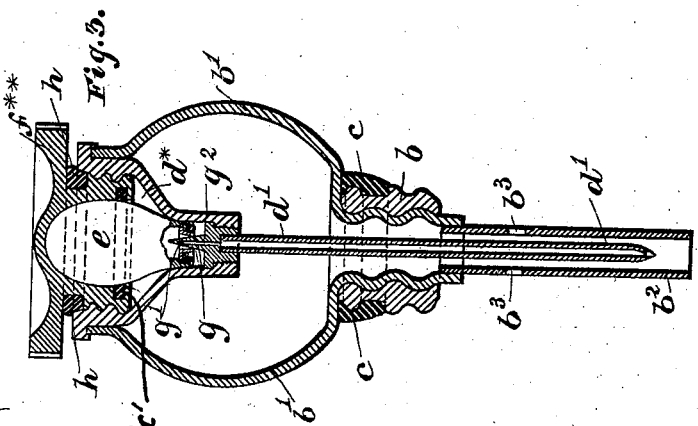
Witnesses:
E. A. Finckel.
Nellie Callahan.
Inventor:
Harry Vaughan Rudston Read.
by Wm. F. Finckel
his Atty.

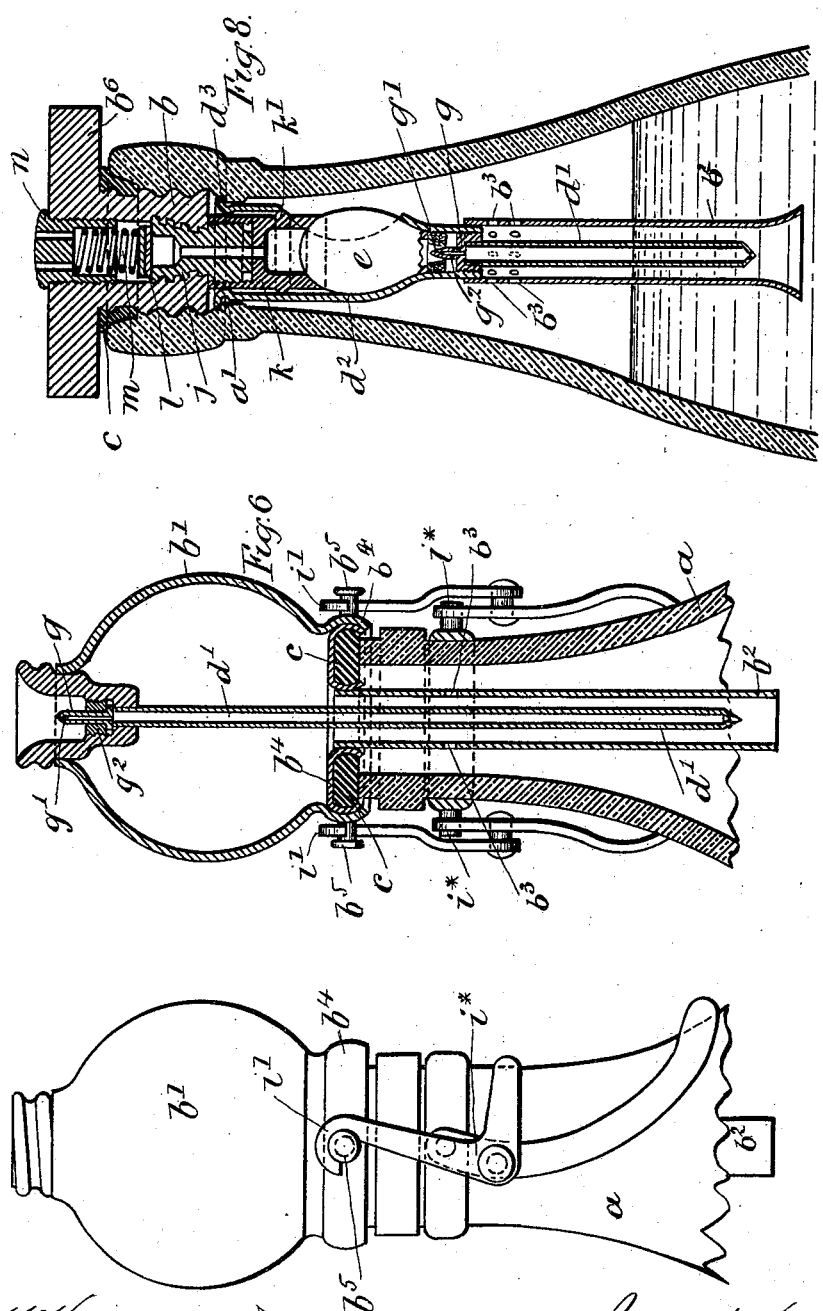

UNITED STATES PATENT OFFICE.

HARRY V. RUDSTON READ, OF LONDON, ENGLAND.

MEANS OR APPARATUS FOR AERATING WATER IN BOTTLES.

SPECIFICATION forming part of Letters Patent No. 620,963, dated March 14, 1899.

Application filed April 9, 1898. Serial No. 677,056. (No model.)

*To all whom it may concern:*

Be it known that I, HARRY VAUGHAN RUDSTON READ, a subject of the Queen of Great Britain, residing at London, England, have invented certain new and useful Improvements in Means or Apparatus Employed in Aerating Water and other Liquids in Bottles and the Like, of which the following is a full, clear, and exact description, and for which I have made application for British Patent No. 6,808, dated March 21, 1898.

The invention relates to that class of apparatus for aerating liquids in bottles and the like in which a small metallic capsule containing liquefied or highly-compressed gas is inserted into the bottle and the gas liberated therefrom after a tight closure of the bottle has been made; and the object of my improvements is to utilize, on the injector principle, the energy stored up in the capsule to agitate the liquid in such a manner that it, in whole or in part, absorbs the gas to such an extent as to materially reduce the pressure and at the same time avoid the danger that has existed in all other bottles and stoppers for aerating liquids hitherto made. I also avoid the necessity which heretofore has existed to shake the bottle so continuously. Another great advantage of the introduction of this system of ejection of the gas into the water and mechanical agitation is that I shall be able with perfect safety to aerate much larger quantities of water at one operation than at present. Larger capsules can be made than hitherto possible under the old process on account of the danger. In large bottles a safety-valve can also be adopted, if considered necessary. Other advantages secured by the use of my invention are that the capsule need not necessarily touch the liquid to be aerated, adding to cleanliness, and that all parts touching the liquid can be made of porcelain, glass, enameled metal, or some other suitable metal which will not injure or deteriorate the liquid.

My invention is illustrated in the accompanying drawings, in which—

Figures 1, 2, 2ª, and 3 are sections showing various methods of carrying my invention into effect. Fig. 4 is a section, and Fig. 5 an external view, showing another modification; and Figs. 6 and 7 are respectively a section and an external view showing another modification. In all the above figures I have represented the combination of an air-chamber with the other parts of my invention. Fig. 8 is a section showing the application of the principal part of my invention to a stopper constructed according to my British Patent No. 3,584, dated February 10, 1897—viz., that part effecting the agitation of the liquid and the consequent reduction of the pressure on account of same.

In all views like parts are indicated by similar letters of reference.

Referring to Fig. 1, $a$ is a bottle-neck provided on the interior with a screw-thread, into which the screw-threaded part $b$ of the stopping and aerating apparatus is screwed and which by the aid of a rubber washer $c$ makes a tight joint with the bottle. The part $b$ is hollow and above it is formed or fixed an air-chamber $b'$, while a tubular circulation-chamber $b^2$ projects from its lower part down into the bottle. Within the air-chamber $b'$ is fixed a chamber $d$ to receive a gas-containing capsule $e$. This chamber is connected at its lower part with an injection-tube $d'$, having a fine exit-orifice, while the upper part of this chamber $d$ projects above the air-chamber $b'$ and has a screw-thread on the exterior thereof, onto which is screwed a cap $f$, forming the top of the chamber $d$. This cap is fitted with a perforating-pin $g$ to perforate the capsule and with a washer $h$ to make a tight joint with the upper end of the chamber $d$. The tubular circulation-chamber $b^2$ has perforations $b^3$ at its upper part and is open at its lower part, which latter extends a little below the lower end of the injection-tube $d'$. In operation the cap or top $f$ is first removed from the chamber $d$, a capsule $e$ is placed within said chamber, and the cap $f$ screwed thereon until the pin $g$ has perforated the capsule $e$. The gas from the latter finds its way around the same into and down the tube $d'$, from the lower end of which it issues in a fine stream with considerable force, thereby causing a vigorous circulation and agitation of the liquid in the bottle, said liquid being drawn through the perforations $b^3$ into the chamber $b^2$ and expelled from the lower end of said chamber. The air-chamber $b'$ has free communication with the interior of the bottle through the chamber $b^2$ and serves to prevent an excessive pressure within the bottle.

The apparatus shown at Fig. 2 is of very similar construction to that of Fig. 1, except that the capsule-containing chamber $d^*$ is external of the chamber $b'$, and the perforating-pin $g$ is fixed in the lower part of said chamber $d^*$ and communicates with the injector-tube $d'$, said pin $g$ having a cross-perforation $g'$ and a longitudinal perforation $g^2$ for such purpose. In addition the capsule $e$ is shown inverted and the cap or top $f^*$ is of form to fit the body of the capsule $e$ and forces the latter against the pin $g$.

The apparatus shown at Fig. $2^a$ is very similar to that shown at Fig. 2, except that the capsule-neck is provided with a screw-thread and screws direct into the upper part of the stopper $d^{**}$, the head of the capsule forming a gas-tight joint against the rubber washer $d^4$. These capsules would probably be closed with a valve and would be utilized again.

The apparatus shown at Fig. 3 is of very similar construction to that shown at Fig. 2, except that the chamber $d^*$ to receive the capsule projects somewhat into the air-chamber $b'$ and is of different form, while it has an internal screw-thread into which the cap or top $f^{}$ is screwed, said part $f^{}$ being formed to fit the body of the capsule and provided with a friction-ring $f'$ to hold the capsule $e$ in position therein when it is being screwed into the chamber $d^*$.

The apparatus shown at Figs. 4 and 5 is very similar to that shown at Fig. 2, except that the bottle-neck is externally screw-threaded and the part $b^*$, connected to the air-chamber $b'$, is formed to screw thereon, while the chamber $d^*$, instead of being closed at the top by a cap or top $f^*$, is provided with packing $f^2$ to make a tight joint with the neck of the capsule $e$, and the latter is forced against the pin $g$ by toggle-lever apparatus $i$ of a similar character to that used with some descriptions of bottle-stoppers.

The apparatus shown at Figs. 6 and 7 is very similar to that shown at Fig. 2, with the exception that the part $b$ and the screw on the bottle-neck are dispensed with and in lieu thereof the lower end of the chamber $b'$ is formed with an annular grooved ring $b^4$ to receive a packing-ring $c$ to make a tight joint with the top of the bottle-neck, and the ring $b^4$ has pins $b^5$ to receive the hooked ends $i'$ of toggle-lever apparatus $i^*$ to force the chamber $b'$ firmly onto the end of the bottle-neck.

When desired, the chamber $b^2$ (shown in Figs. 1 to 7) may be of bell shape, as shown in Fig. 8.

In the apparatus shown at Fig. 8 the air-chamber $b'$ is dispensed with. In this case the bottle-neck $a$ has an internal screw-thread, and the part $b$ is formed with a head $b^6$, by which it can be screwed into the bottle-neck. The parts $b\ b^6$ are bored centrally, and the lower portion of the part $b$ has fixed therein a centrally-perforated block $j$, onto which is screwed a cylindrical piece $k$. Within the parts $b\ b^6$ is fitted a safety-valve $l$, acted upon by a spring $m$, the strength of which is regulated by a perforated screw-plug $n$. The capsule-holder $d^2$ is formed with an opening in its side, through which the capsule is inserted and withdrawn, and it has a flange $d^3$, which when the apparatus is in position is supported by the seat $a'$ in the bottle-neck. The capsule-holder $d^2$ is capable of movement relatively to the cylindrical piece $k$, and such motion is limited by the collar $k'$ around such piece. The lower part of the capsule-holder $d^2$ has fixed therein the perforating-pin $g$ and the tube $d'$, and around this latter is fixed the circulation-chamber $b^2$, which in this case is bell-shaped at its lower end. The operation of this arrangement is as follows: A capsule is placed within the holder. The stopper $b\ b^6$ is screwed into the bottle-neck. In the early part of such motion the capsule-holder becomes supported by the seat $a'$. Then the stopper forms a tight joint with the bottle-neck and the cylindrical piece $k$ forces the capsule onto the perforating-pin $g$, which latter is cross and centrally bored, as before explained. The gas from the capsule passes through the pin $g$ into the tube $d'$ and from the lower end of the latter into the circulation-chamber $b^2$, whence it issues in a fine stream at the lower part into the liquid in the bottle, and thus sets up a vigorous circulation of such liquid through the chamber $b^2$, causing the reduction of pressure, as before described. In this case the bottle should not be filled higher than that shown. In the event of an excess of pressure arising within the bottle it is relieved by the valve $l$, and the excess of gas passes away through the perforated plug $n$. By turning the bottle upside down or placing the apparatus herein described at the lower part of the bottle the pressure within the bottle is still further reduced and the agitation of the liquid is more perfect.

I would here remark that the methods of forming a tight joint between the aerating apparatus and the bottle-neck and the arrangement of means for holding and perforating the capsule may be varied and in some cases the perforations in the circulation-chamber are omitted.

What I claim as my invention, and desire to secure by Letters Patent, is—

1. In an apparatus for aerating liquids in bottles and the like, the combination with a stopper having means for holding a capsule and releasing the gas in the same, of an external safety air-chamber secured to said stopper and having free communication with the interior of the bottle, an ejecting-tube provided with a fine exit-orifice and carried by said stopper and communicating with the capsule-holder and down which the gas from the capsule passes, a perforated circulation-chamber also carried by said stopper and surrounding the ejecting-tube and into which the gas is delivered in a fine stream from the ejecting-tube, and an opening at the lower end of such circulation-chamber, substantially as herein set forth and for the purpose stated.

2. In an apparatus for aerating liquids in bottles and the like, the combination with a stopper having means for holding a capsule and releasing the gas in the same, of an ejecting-tube provided with a fine exit-orifice and carried by said stopper and communicating with the capsule-holder, and down which the gas from the capsule passes, a perforated circulation-chamber also carried by said stopper and surrounding the ejecting-tube, and into which the gas from the ejecting-tube is delivered in a fine stream, and an opening at the lower end of such circulation-chamber, substantially as herein set forth and for the purpose stated.

3. In an apparatus for aerating liquids in bottles and the like, the combination with a stopper having means for holding a capsule and releasing the gas in the same, of an external safety air-chamber secured to said stopper and having free communication with the interior of the bottle, an ejecting-tube provided with a fine exit-orifice and carried by said stopper and communicating with the capsule-holder and down which the gas from the capsule passes, a circulation-chamber also carried by said stopper and surrounding the ejecting-tube, and into which the gas is delivered in a fine stream from the ejecting-tube, and an opening at the lower end of such circulation-chamber, substantially as herein set forth and for the purpose stated.

4. In an apparatus for aerating liquids in bottles and the like, the combination with a stopper having means for holding a capsule and releasing the gas in the same, of an ejecting-tube provided with a fine exit-orifice and carried by said stopper and communicating with the capsule-holder and down which the gas from the capsule passes, a circulation-chamber also carried by said stopper and surrounding the ejecting-tube and into which the gas from the ejecting-tube is delivered in a fine stream, and an opening at the lower end of such circulation-chamber, substantially as herein set forth and for the purpose stated.

5. In an apparatus for aerating liquids, the combination of a stopper carrying on its under side a tube passing into the liquid and forming a circulation-chamber, and carrying on its upper side an expansion-chamber which is provided with a holder to receive a capsule containing compressed gas, means for opening said capsule and attached to said capsule-holder, and a gas-ejecting tube provided with a fine exit-orifice passing down into the liquid in the interior of the circulation-chamber, substantially as set forth.

6. In an apparatus for aerating liquids in bottles and the like, the combination of a stopper having an expansion-chamber and means for carrying a capsule and releasing the gas from the same, of an ejecting-tube having a fine exit-orifice and a circulation-chamber surrounding said ejecting-tube, substantially as herein set forth.

In testimony whereof I affix my signature in presence of two witnesses.

H. V. RUDSTON READ.

Witnesses:
A. GARY,
H. SEYMOUR MILLS.